(12) United States Patent
Probst et al.

(10) Patent No.: US 10,683,087 B2
(45) Date of Patent: Jun. 16, 2020

(54) SHROUDED ROTARY ASSEMBLY FROM SEGMENTED COMPOSITE FOR AIRCRAFT

(71) Applicant: AIRBUS HELICOPTERS DEUTSCHLAND GMBH, Donauworth (DE)

(72) Inventors: Stefan Probst, Schönau (DE); Marc Nothen, Rain Am Lech (DE); Christian Wehle, Augsburg (DE)

(73) Assignee: AIRBUS HELICOPTERS DEUTSCHLAND GMBH, Donauworth (DE)

( * ) Notice: Subject to any disclaimer, the term of this patent is extended or adjusted under 35 U.S.C. 154(b) by 0 days.

(21) Appl. No.: 16/020,525

(22) Filed: Jun. 27, 2018

(65) Prior Publication Data

US 2019/0016452 A1 Jan. 17, 2019

Related U.S. Application Data

(63) Continuation of application No. 14/554,191, filed on Nov. 26, 2014, now Pat. No. 10,035,590.

(30) Foreign Application Priority Data

Nov. 29, 2013 (EP) ..................................... 13400036

(51) Int. Cl.
*B64C 27/82* (2006.01)
*B29C 70/30* (2006.01)
(Continued)

(52) U.S. Cl.
CPC .............. *B64C 27/82* (2013.01); *B29C 70/30* (2013.01); *B32B 38/0012* (2013.01);
(Continued)

(58) Field of Classification Search
CPC .. B29C 70/30; B64C 27/82; B64C 2027/8254
See application file for complete search history.

(56) References Cited

U.S. PATENT DOCUMENTS

| 4,585,391 A | 4/1986 | Vuillet et al. |
| 5,108,044 A | 4/1992 | Weiner et al. |

(Continued)

FOREIGN PATENT DOCUMENTS

| CA | 2042235 | 11/1991 |
| DE | 102006051867 | 5/2008 |

(Continued)

OTHER PUBLICATIONS

Extended European Search Report for European Application No. 13400036.3, Completed by the European Patent Office, dated May 26, 2014, 4 Pages.

*Primary Examiner* — Woody A Lee, Jr.
(74) *Attorney, Agent, or Firm* — Brooks Kushman P.C.

(57) ABSTRACT

A shrouded rotor assembly for an aircraft. The shrouded rotor assembly comprises a stator hollow structure comprises formed from a plurality of composite angular segments. Each composite angular segment includes: a core arched section of a central hub casing, a peripheral rim section of an external hollow duct and a pair of angularly opposed sliced portions, respectively for one of a pair of guide vanes. The resulting stator hollow structure is a unitary one-piece, integrating together continuously the composite angular segments. The invention typically applies e.g. to aircrafts such as rotary wing aircrafts.

19 Claims, 4 Drawing Sheets

(51) Int. Cl.
 *B32B 38/00* (2006.01)
 *F04D 29/52* (2006.01)
 *B29L 31/30* (2006.01)
(52) U.S. Cl.
 CPC .... *F04D 29/522* (2013.01); *B29L 2031/3088* (2013.01); *B32B 2038/0052* (2013.01); *B64C 2027/8254* (2013.01)

(56) References Cited

U.S. PATENT DOCUMENTS

| | | | |
|---|---|---|---|
| 5,251,847 A | | 10/1993 | Guimbal |
| 5,454,691 A | * | 10/1995 | Henri ................... B64C 27/82 |
| | | | 244/17.19 |
| 5,498,129 A | * | 3/1996 | Dequin .................. B64C 27/82 |
| | | | 244/17.19 |
| 5,562,264 A | | 10/1996 | Bietenhader |
| 5,605,440 A | | 2/1997 | Bocoviz et al. |
| 5,634,611 A | * | 6/1997 | Marze .................... B64C 27/82 |
| | | | 244/17.19 |
| 7,389,583 B2 | * | 6/2008 | Lundgren .......... B23K 15/0093 |
| | | | 29/889.22 |
| 7,676,923 B2 | | 3/2010 | Maille et al. |
| 7,959,105 B2 | | 6/2011 | Marze |
| 2003/0235502 A1 | | 12/2003 | Van Dine et al. |
| 2006/0169835 A1 | | 8/2006 | Maille et al. |
| 2007/0013242 A1 | | 1/2007 | Tung et al. |
| 2009/0152395 A1 | | 6/2009 | Maize |
| 2010/0019564 A1 | | 1/2010 | Theuer |
| 2010/0130093 A1 | | 5/2010 | Van De Rostyne et al. |
| 2011/0129341 A1 | | 6/2011 | Seitz |
| 2011/0217163 A1 | | 9/2011 | Camci et al. |
| 2013/0011605 A1 | * | 1/2013 | Miller ................ B29D 99/0014 |
| | | | 428/119 |
| 2013/0327881 A1 | * | 12/2013 | Schneider ............... B64C 27/82 |
| | | | 244/17.21 |
| 2014/0070051 A1 | * | 3/2014 | Kreitmair-Steck ..... B64C 27/82 |
| | | | 244/1 N |

FOREIGN PATENT DOCUMENTS

| | | |
|---|---|---|
| EP | 1344634 | 9/2003 |
| EP | 1676775 | 7/2006 |
| GB | 572417 | 10/1945 |
| WO | 2012169906 | 12/2012 |

* cited by examiner

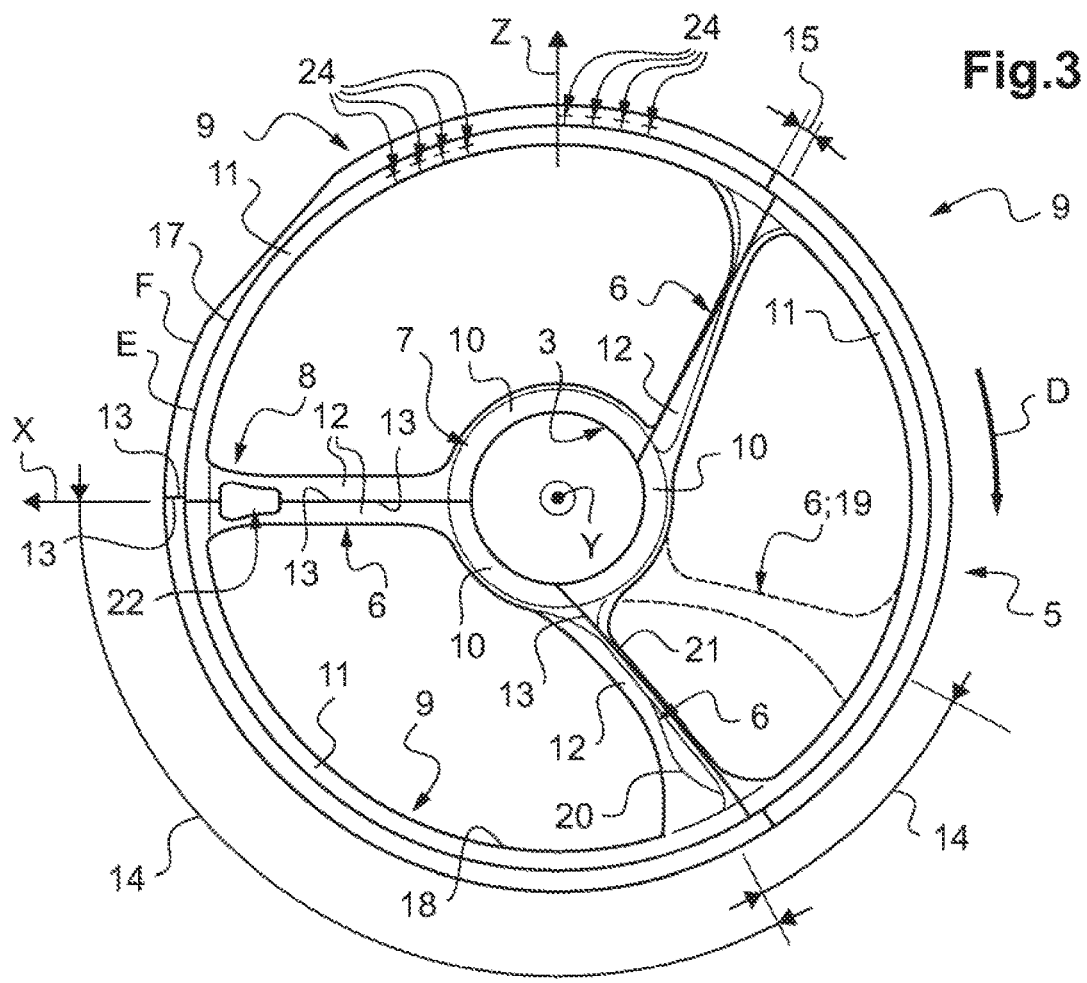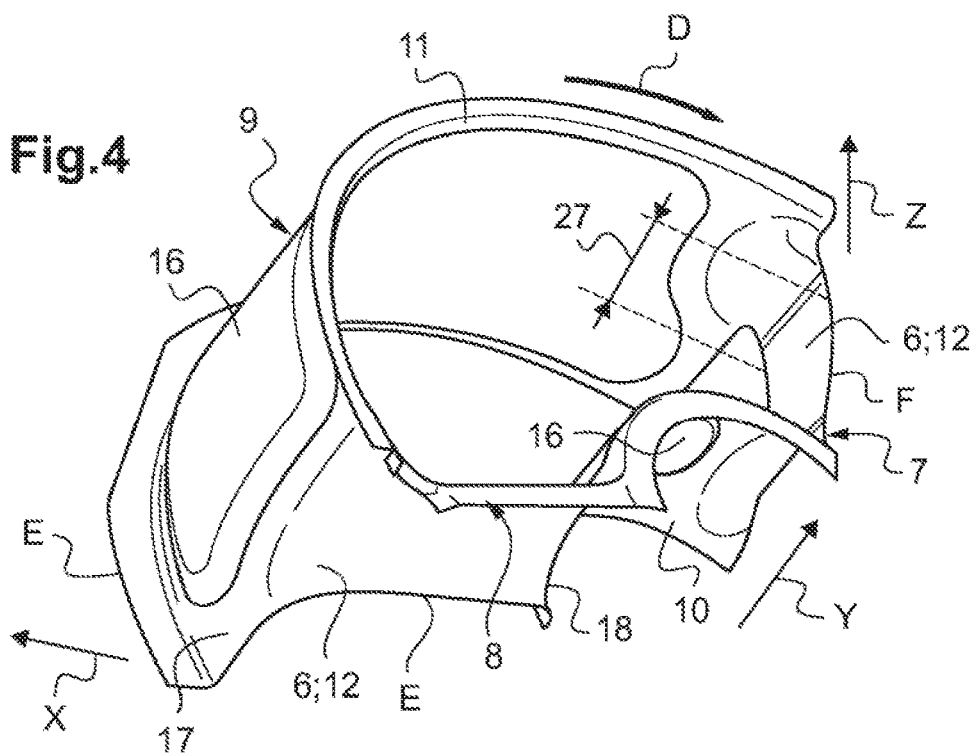

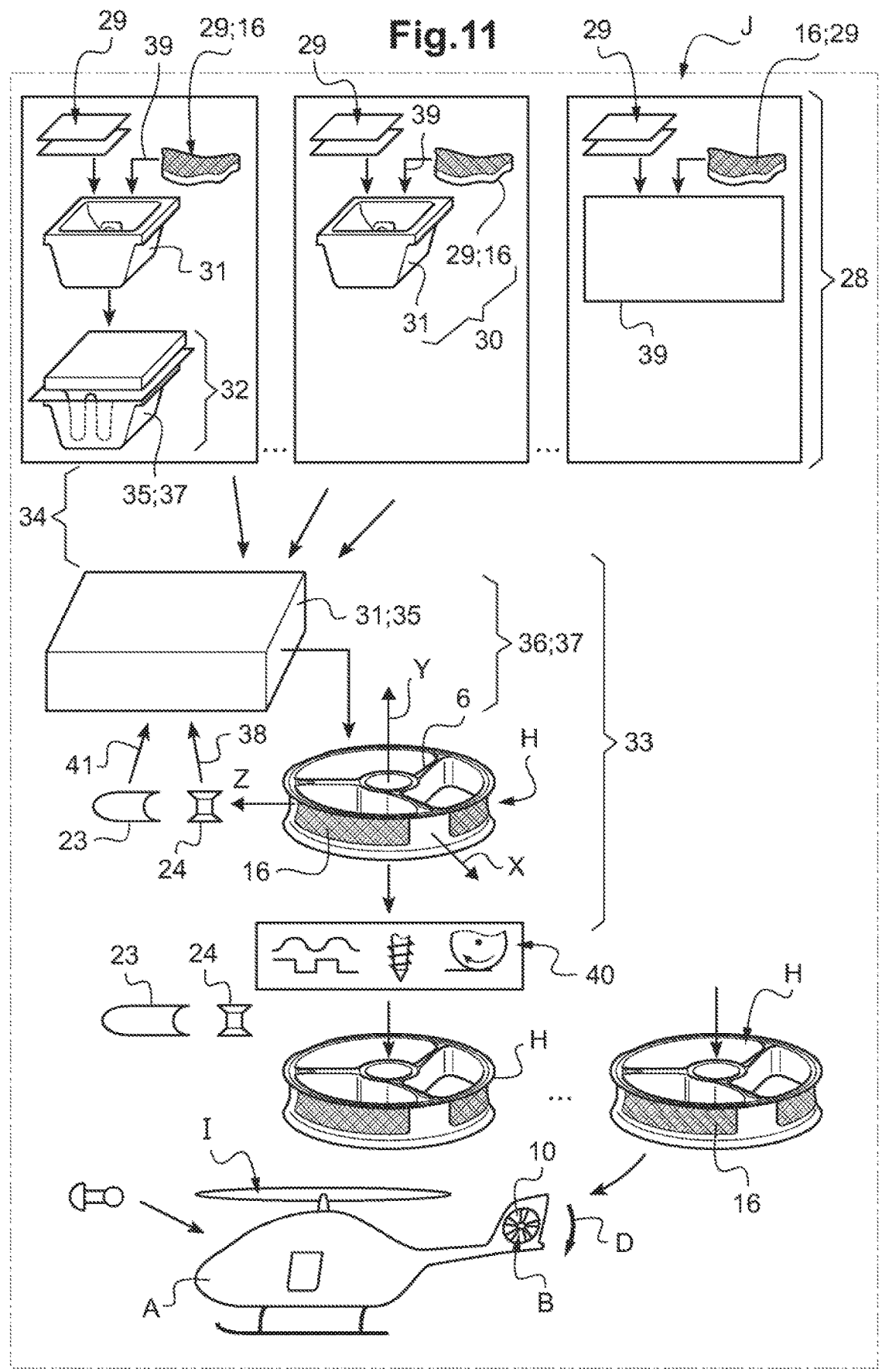

SHROUDED ROTARY ASSEMBLY FROM SEGMENTED COMPOSITE FOR AIRCRAFT

CROSS REFERENCE TO RELATED APPLICATION

This application is a continuation of U.S. application Ser. No. 14/554,191 filed Nov. 26, 2014, and issued on Jul. 31, 2018 as U.S. Pat. No. 10,035,590, which in turn claims priority to European patent application No. EP 13 400036.3 filed on Nov. 29, 2013, the disclosures of which are incorporated in their entirety by reference herein.

BACKGROUND OF THE INVENTION

(1) Field of the Invention

The invention concerns manufacturing of a stator hollow structure for a shrouded rotary assembly, and an aircraft equipped with such an assembly.

Therefore, the most general technical domain of the invention is the domain of propulsion rotary assemblies, for creating airflows by rotating blades (i.e. airfoil designs providing a "fan like" effect).

(2) Description of Related Art

Traditional helicopters comprise a main rotor that provides lift and propulsion. Traditional helicopters also comprise an open-type tail rotor. The tail rotor has a transverse axis and is generally acting so to control the yaw movement of the helicopter.

Many types of shrouded rotary assemblies for aircrafts have been proposed. Since the late 1960s, shrouded rotary assemblies are widely used in helicopters. The most renowned shrouded tail rotors for rotary wing aircrafts are called "Fenestron"®.

In short, a shrouded rotary assembly mainly includes a driven rotor system (commonly called rotor) comprising the rotating blades, and a stator hollow structure (commonly called stator). The rotary blades are operated inside an external hollow duct defined by the stator hollow structure.

So, the stator hollow structure comprises an external hollow duct surrounding a central hub casing. The central hub casing is mounted in the external hollow duct via a plurality of profiled guide vanes.

In such assemblies, the profiled guide vanes are rigid beams, fixedly attached between the central hub casing and the stator hollow structure. These profiled guide vanes are shaped with an aerodynamic profile.

The items of the stator hollow structure are manufactured separately as unitary items, so as to be assembled under consideration of tolerances and corrosion prevention. Most of the times, the separated unitary items of such structure include the external hollow duct, the central hub casing and a series of unitary profiled guide vanes, to be assembled by added mechanical means such as rivets.

Therefore special tools for assembling and installation are needed. Besides, operating assembling and installation are time consuming.

In some rotorcrafts, the external hollow duct is a unitary aluminum ducted part. This part is machined to provide a flange allowing adapting of the central hub casing and to have the profiled guide vanes rigidly fixed therein. In such rotorcrafts, the guide vanes are frequently profiled aluminum extrusion parts, which are finished by chemical milling.

Even if some shrouded rotary assemblies comprise composite parts since the early 1980s, e.g. the rotary blades, many recent assemblies still include metallic parts, e.g. attachment means for the central hub casing. Such metallic parts are subjected to corrosion, and may be bulky/heavy/somehow detrimental to aerodynamics, relatively to a so-called integrated structure.

Besides, manufacturing steps like machining, milling and assembling of numerous unitary items can be cumbersome, costly and prone to human errors (proportionally to the extent of non-automated manufacturing steps).

For aerodynamic reasons and to save weight, a slim design of the profiled guide vanes and of the attachment means is preferred.

Such a slim design interferes with capacities of load bearing of these vanes and attachment means. Thus, aerodynamic performance and weight reduction are antagonistic to load bearing. This is especially detrimental in rotary wing aircrafts.

With a slim design, the loads exerted on the guide vanes leads to stress peaks in the tight radii of the attachment means and therefore tends to increase wall thicknesses in the attachment means and in the external hollow duct. Considering the fact that the stator hollow structure is exposed to high fatigue loads due to stressing forces and vibrations, slim designs may be quite sensitive to fatigue cracks.

In view of limitations of slim designs, classical designs may also appear as expensive, vulnerable to corrosion and fatigue cracks, while being too heavy.

The following prior art documents are known: CA2042235, DE102006051867, EP1344634, EP1676775, GB572417, U.S. Pat. Nos. 4,585,391, 5,108,044, 5,251,847, 5,498,129, 5,562,264, 5,605,440, 7,959,105, US2003/235502, US2006/169835, US2007/013242, US2009/152395, US2010/130093, US2011/129341, US2011/217163 and WO2012169906.

The document. CA2042235 describes an unmanned flight vehicle wherein two counter-rotating rotors are positioned within a toroid fuselage. The toroid fuselage is a unitary structure from composite materials, having inner integrated struts to support a separated strut on which the counter-rotating rotors are mounted. The toroid fuselage is having separated inner radial wall mounted therein.

The document EP1344634 describes the molding of fixed blades for a helicopter rotor. The fixed blades are attached to a central hub and a peripheral through seal. The fixed blades are having a number of layers of composite material and are polymerized while being compacted between a matrix and a molding surface of a mold.

The document GB572417 describes a classical helicopter, having a tail boom with a counter torque ducted rotor in a fuselage assembly.

The document U.S. Pat. No. 4,585,391 describes a helicopter tail that comprises a part of fuselage and a vertical fin. In the fin, a tunnel is formed downstream of blades of a rotor. The tunnel is provided with a plurality of fixed blades. The fixed blades are adapted to recover the energy of rotation of the air flow passing through the tunnel and are disposed radially with respect to the tunnel.

The plurality of fixed blades are mounted to become integral with an assembly comprising an outer ring, provided with a flange, and an inner ring, the fixed blades being fastened at their ends with the outer ring and inner ring. These two concentric rings comprise notches or interruptions respectively for the passage of arms.

To avoid the outer ring of forming excess thickness with respect to the wall of a divergent portion, this wall comprises the impression of said outer ring. Similarly, the impression of inner ring is provided in a hub. The support arms are distributed equally about a rotation axis, with the fixed blades to form three identical groups separated from one another and each adapted to be inserted in the space between two of said arms.

The document U.S. Pat. No. 5,251,847 describes a light helicopter that comprises a rear anti-torque system. A fuselage comprises a central part extended rearwards by a tail. The anti-torque system is arranged at the end of the tail and comprises an anti-torque tail rotor with rotating blades. A fairing defines an aerodynamic tunnel in a cylindrical shape in which the tail rotor is housed coaxially. The fairing is arranged at the base of a vertical fin. A tail gearbox is coupled to the tail rotor. Fixing arms are provided for fixing the tail gearbox with respect to the structure of the tunnel.

The document U.S. Pat. No. 5,498,129 describes a helicopter anti-torque system arranged with a tail gearbox. The tail gearbox is in a housing cast as a single piece from metal alloy.

The document U.S. Pat. No. 5,605,440 describes composite vanes for a counter torque ducted device. The vanes and a central body are injection molded as a single piece using the RTM method.

The document U.S. Pat. No. 7,959,105 describes an aircraft having a streamlined stator pierced by an air flow duct defined around an axis of symmetry. The aircraft has a shrouded rotor with rotary blades arranged in said static air flow duct. The periphery of the static air flow duct is provided in succession of a first lip, a second lip and of a first rear portion at the side of the duct that is closer to the rear end of the aircraft.

The document US2006/169835 describes the making of a helicopter tail structure with a rotor aperture lined by a single pieced ring with two end collars or flanges. The single pieced ring, is made from a composition material with an organic matrix and reinforcing elements, fixed together by solidifying the matrix.

The document WO2012169906 describes a helicopter structure and in particular to composite. The helicopter has a tail boom and a fan duct structure with a fin attached to a section of empennage using a coupling member. The coupling member is an integral combination of a mechanical fastening provided by a head and a chemical bond provided by a cured adhesive. The stator hollow structure is a one-pieced ring made of composite.

The above shows remaining limits and drawbacks pertaining to shrouded rotary assemblies.

Therefore, a wide demand exits for enhanced shrouded propulsion rotary assemblies. At least one of the following improvements would be useful: reduction of weight, of recurring costs and of manufacturing time. Besides, enhancing the aerodynamic and acoustic performances of the profiled guide vanes would be useful in some cases. Increasing, the fatigue strength and avoiding corrosion problems would be also highly beneficial in certain conditions.

The invention is therefore useful by offering a stator hollow structure for a shrouded rotary assembly, manufactured from composite angular segments. A predetermined number of such composite segments are defined, so that all the segments are angularly complementary with the stator hollow structure to be obtained when finalized. This means that when all the segments are gathered side-by-side, the resulting juxtaposed arrangement encompass the overall shape of the stator hollow structure.

BRIEF SUMMARY OF THE INVENTION

An object of the invention is a manufacturing method for making a stator hollow structure for a shrouded propulsion rotary assembly for an aircraft. The stator hollow structure comprises at least:

a central hub casing for a stator gearbox of the stator hollow structure; an external hollow duct surrounding the central hub casing; and between the central hub casing, and the external hollow duct, at least three profiled guide vanes, each forming a fixed blade supporting the central hub casing; each profiled guide vane having a radial shank location and a radial tip location; each radial shank location being fixedly attached to the central hub casing and each radial tip location being fixedly attached to the external hollow duct.

The manufacturing method of the invention comprises the steps of:

in a preparing step, preparing separately from components of composite material at least three composite angular segments, so that each composite angular segment comprises: a core arched section of the central hub casing, a peripheral rim section of the external hollow duct and, between the core arched section and the peripheral rim section, a pair of angularly opposed sliced portions respectively for two guide vanes;

in a finalizing step, finalizing the stator hollow structure by gathering the composite angular segments, once prepared; the finalizing step forming a unitary piece encompassing an overall shape of the stator hollow structure through a securing stage of forming the stator hollow structure in a unitary one-piece encompassing the overall shape; the securing stage providing securing together the continuously integrated composite angular segments.

During the preparing step, an operator is manufacturing the composite angular segments. Each sliced portion is integral with an extreme part of the core arched section and with an extreme portion of the peripheral rim section. Consequently, each composite angular segment is O-shaped.

Generally speaking, we understand by "integral" that each sliced portion is manufactured with the corresponding core arched section and peripheral rim section to form a single piece.

In various embodiments, the word "integrated" means that there is a material continuity that excludes joints/mechanical or added connections. For a metal integrated structure, this means no interruption of the material and no joints like mechanical fastening or welding. For a finished composite integrated structure, this means an uninterrupted junction of two portions, providing a composite material continuity in terms of the matrix resin, despite the fact that the fibers can be either uninterrupted or interrupted.

During the securing stage, each sliced portion of a composite angular segment is secured to a sliced portion of the adjacent composite angular segment to term a guide vane.

The manufacturing, processing and connection to the aircraft to be equipped with the shrouded rotary assembly manufactured from several composite angular segments can be faster, more reproducible and less prone to defaults than some prior art. While operated, the resulting shrouded rotary assembly manufactured can be more silent and provides a highly efficient air flux. When pre-assembled, such a stator hollow structure can make it useless many attachment brackets and the like, and offers smoother transition areas at the junctions which are integrated.

In the non-limitative examples, the invention concerns a stator hollow structure for a shrouded rotary assembly for an aircraft, this aircraft being a rotary wing aircraft. For instance, the shrouded propulsion rotary assembly is for an anti-torque rotor, such as the ones located on a tail boom of a rotary wing aircraft, e.g. of a helicopter.

But the various types of aircrafts allowing industrial application of the invention are chosen among, e.g: airplanes, hybrid aircrafts, rotorcrafts and drones, Unmanned Aerial Vehicles (UAV), where one or a plurality of shrouded propulsion rotary assemblies effect on altitude/direction/advancement of the aircraft.

In an embodiment, the manufacturing method comprises a layup step of arranging separately in a layup tool, the components of composite material for one composite angular segment.

In an embodiment, the manufacturing method comprises a preforming step of shaping together the components of composite material arranged in a layup tool, thus shaping the composite angular segment to a predetermined preform that can be handled.

In an embodiment, the manufacturing method comprises a preforming step of laminating separately each composite angular segment; the finalizing step providing a curing stage wherein each composite angular segment is cured separately one from the others, in at least one curing chamber; the finalizing step also providing a securing stage that is executed by direct mechanical attaching of the cured composite angular segments with additional securing items, chosen among: shimming, rivets, screws and bolts, gluing, cross-melting and soldering.

In an embodiment, the manufacturing method comprises a preforming step of shaping individually each composite angular segment without curing; the finalizing step also providing a securing stage that provides a simultaneous curing of the composite angular segments together, in a common curing chamber chosen among: autoclave and oven.

In an embodiment, the manufacturing method comprises an addition stage of incorporating in at least one composite angular segment, at least an intermediate added guide vane, between the angularly opposed sliced portions.

In an embodiment, the manufacturing method comprises a reinforcing stage of incorporating to one of the composite angular segments, at least a reinforcing honeycomb band; the reinforcing honeycomb band being incorporated in the core arched section and or the peripheral rim section, for stabilization purposes.

In an embodiment, the manufacturing method comprises a protection stage of stage providing mounting at least a U-shaped spoiler covering at least partly a guide vane.

In an embodiment, the manufacturing method provides that at least a guide vane is having a trailing edge and a leading edge: the protection stage comprising mounting the U-shaped spoiler on at least one of the: leading edge and/or trailing edge: the protection stage being chosen among: direct mechanical attaching with additional securing items and continuously integrating the U-shaped spoiler into the composite angular segment.

Another object of the invention is a stator hollow structure for a shrouded propulsion rotary assembly for an aircraft; the stator hollow structure comprising at least a central hub casing for a stator gearbox of the stator hollow structure; an external hollow duct surrounding the central hub casing; and between the central hub casing and the external hollow duct, at least three profiled guide vanes, each forming a fixed blade supporting the central hub casing; each profiled guide vane having a radial shank location and a radial tip location; each radial shank location being fixedly attached to the central hub casing and each radial tip location being fixedly attached to the external hollow duct.

The stator hollow structure of the invention comprises at least three composite angular segments; each composite angular segment includes: a core arched section of the central hub casing, a peripheral rim section of the external hollow duct and, between the core arched section and the peripheral rim section, a pair of angularly opposed sliced portions respectively for each profiled guide vane; the composite angular segments forming a unitary piece encompassing the overall shape of the stator hollow structure, wherein each composite angular segment is disposed aside a neighboring composite angular segment.

In an embodiment, in each composite angular segment, the core arched section and the peripheral rim section are each generally in the form of a cylinder section extended along an arc fragment; the arc fragment of the composite angular segment having an angular value; at least two arc fragments of two neighboring composite angular segments are angularly extended with uneven/irregular angular values, each angular value being different from the angular value of at least one neighboring composite angular segment.

In an embodiment, the stator hollow structure is having at least one guide vane comprising at least a convex contour relatively to a radial direction of the stator hollow structure.

In an embodiment, at least a guide vane is having a trailing edge; at least a series of convex contour tenons and concave mortise keys being located at the trailing edge of the guide vane.

In an embodiment, at least one guide vane is at least locally extending in a non-parallel direction relative to a radial overall radius of the stator hollow structure; in the guide vane, the radial shank location being upwardly shifted against a bottom-forward rotational motion of a set of rotating blades of the shrouded propulsion rotary assembly, relative to the parallel direction to the radial overall radius of the stator hollow structure.

In an embodiment, at least one guide vane is upwardly shifted relative to a radial overall radius of the stator hollow structure, against a bottom-forward rotational motion of a set of rotating blades of the shrouded propulsion rotary assembly, each upwardly shifted guide vane being at least locally extending tangent to an external circumference of the central hub casing.

In an embodiment, at least one guide vane is at least locally non-straight lined, by at least a local curvature relative to a radial overall radius of the stator hollow structure; the local curvature being chosen among: a local curvature about the peripheral rim section oriented convex upstream and a local curvature about core arched section oriented concave downstream, relative to a bottom-forward rotational motion.

Another object of the invention is an aircraft having at least one shrouded rotary assembly. The shrouded rotary assembly is including at least one stator hollow structure manufactured by executing the above manufacturing method.

BRIEF DESCRIPTION OF THE SEVERAL VIEWS OF THE DRAWINGS

A short description of the drawings follows.

Presently preferred embodiments of the invention are presented in the following description with reference to the attached drawings.

FIG. 3 is a radially upright front view of a stator hollow structure as per the invention, obtained by separated layup and laminating of several composite angular segments distinct the ones from the others, and curing the segments in separated curing chambers before being gathered by additional securing items; the FIG. 3 also shows in dotted lines, an intermediate added guide vane, between the angularly opposed sliced portions, defining arc fragments of two neighboring composite angular segments which are angularly extended with uneven/irregular angular values; the FIG. 3 also shows local angular shifted and non-straight guide vanes.

FIG. 4 is a schematic perspective view of an example of a composite angular segment as per the invention, typically individually preformed but not cured and then gathered with complementary composite angular segments, through simultaneous curing of all segments together.

FIG. 11 is a diagrammatic how chart exposing some available steps and stages of various embodiments of the method according to the invention.

DETAILED DESCRIPTION OF THE INVENTION

Figure 1:
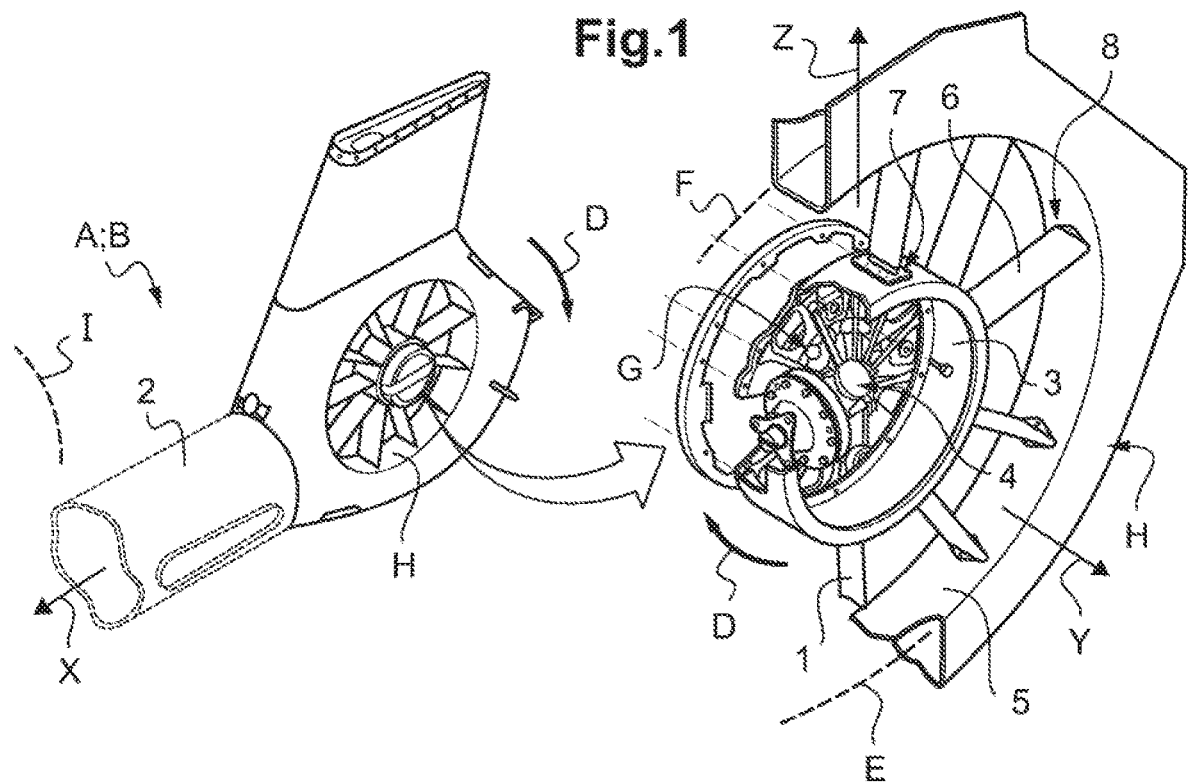
FIG. 1 is a schematic perspective part split-view of an example of non-claimed propulsion rotor assembly, forming a shrouded anti-torque rotor mounted on a tail boom belonging to the fuselage of a rotary wing aircraft.

A detailed description of illustrated embodiments follows. In drawings, elements that are similar are given the same reference numerals.

Some figures show three mutually orthogonal directions X, Y and Z. The directions X, Y and Z together define a referential XYZ.

A reference direction X referred to as being longitudinal corresponds to the length dimension of the aircrafts described. Terms such as front rear are relative thereto. The longitudinal direction X is deemed to be parallel to a roll axis of the aircraft.

Another direction Y, said to be "transverse", corresponds to the thickness or lateral dimension of the structures described. The terms "side" or "left" right" are relative thereto. Here, the rotational axis of rotational items is along the transverse direction Y. In a rotary assembly, upstream/downstream or inlet outlet as well as leading/trailing refers to orientations/locations along with this transverse direction Y. For instance, a controlled airflow C is considered as being mainly directed along this direction Y. This direction Y is deemed here as being parallel to a pitch axis of the aircraft.

Another direction Z is referred to as the elevation direction. The direction Z corresponds to the radial length/height of the structures described. For rotational/circular parts, the radius is considered as extending along the elevation direction Z, i.e. as being orthogonal to directions X and Y. Here, the direction Z is deemed as being parallel to a yaw axis of the aircraft.

On the FIG. 1, an aircraft A is illustrated. In this example, the aircraft A is a rotary wing aircraft, such as a helicopter provided with a main rotor 1 shown on FIG. 1. But objects of the invention cover various types of rotorcrafts. The aircraft A is equipped with one or a plurality of shrouded rotary assemblies B including a set of rotating blades 1. The aircraft A can be provided with a tail boom 2 carrying a fin. Consequently, a stator hollow assembly B can be arranged in the fin.

Into each shrouded rotary assembly B, control airflow C is created by rotating, rotor blades 1. In FIGS. 1-4 and 11, is shown a bottom-forward rotational motion D of the set of rotating blades 1 around a rotational axis (along the transverse direction Y).

On FIG. 1, the rotary assembly B is of the shrouded/ducted type. In short, the shrouded rotary assembly B mainly includes:
- a driven rotor system G, including the rotor blades 1 and a gearbox 4; and
- a stator hollow structure H.

Figure 2:
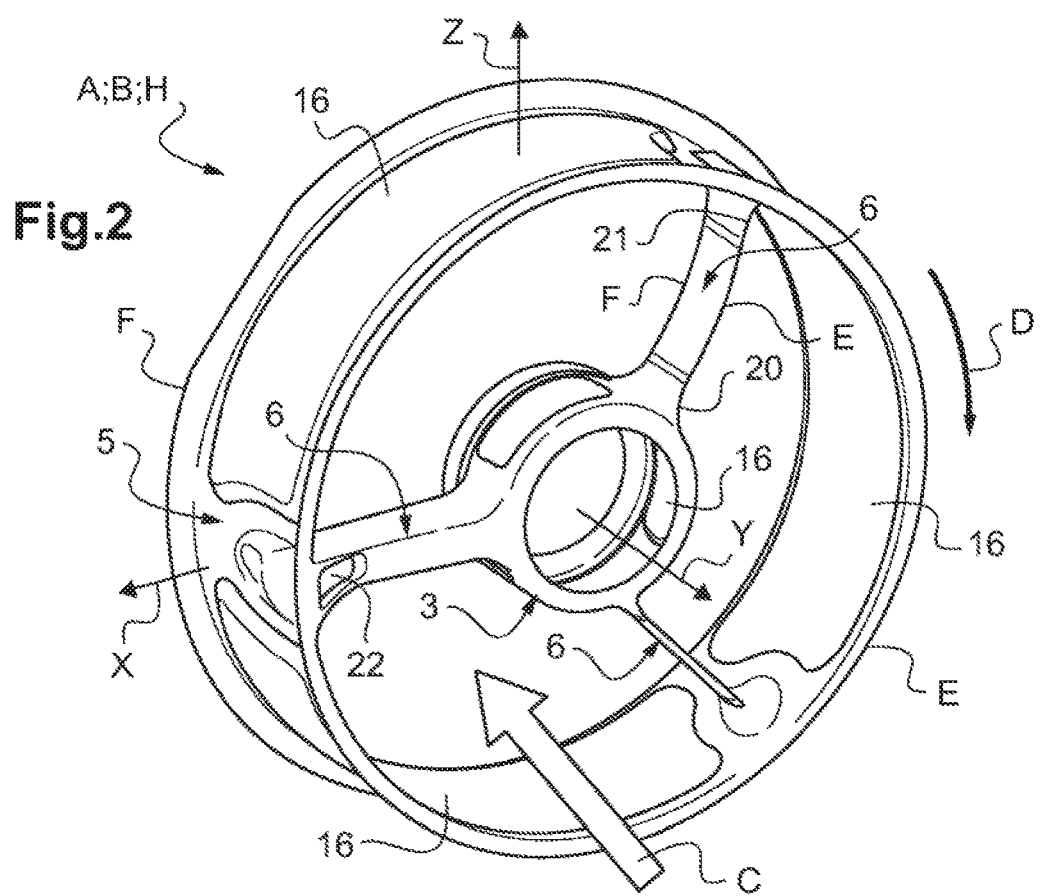
FIG. 2 is a schematic perspective view of an example of a stator hollow structure.

According to the FIG. 2, the stator hollow structure H comprises a central hub casing 3 with a static control body. The central hub casing 3 is supporting the gearbox 4.

The stator hollow structure H of the invention comprises also an external hollow duct 5 surrounding the central hub casing 3, and at least three guide vanes 6 extending between the central hub casing 3 and the external hollow duct 5.

Each guide vane 6 is forming a fixed blade supporting the central hub casing 3. Each guide vane 6 is having a radial shank location 7 and a radial tip location 8. Each radial shank location 7 is fixedly attached to the central hub casing 3 and each radial tip location 8 is fixedly attached to the external hollow duct 5. Classically, the guide vanes 6 are profiled.

The stator hollow structure H can be obtained by unitary layup, forming and one-shot curing of the stator hollow structure H, in a single curing chamber.

FIG. 3 shows an embodiment of the stator hollow structure H of the invention that is mainly composed by a plurality of composite angular segments 9. Various embodiments of such composite angular segments 9 are shown alone on FIGS. 4, 8-10 and 11.

The stator hollow structures H of the invention provides a dial-like dispatching of structural groups of composite angular segments 9.

In short, each composite angular segment 9 includes:
- a core arched section 10 of the central hub casing 3,
- a peripheral rim section 11 of the external hollow duct 5 and a pair of sliced portions 12, respectively for two guide vanes 6, angularly opposed in the composite angular segments 9.

Each sliced portion 12 extends between an external part of a core arched section 10 and an external portion of the peripheral rim section 11. Each composite angular segment 9 forms a closed shape, the core arched section, the peripheral rim section and each sliced portion representing a face of said shape.

Thus, all the composite angular segments 9 are forming together a unitary piece encompassing the overall shape of the stator hollow structure H, wherein each composite angular segment 9 is disposed aside a neighboring composite angular segment 9.

With the invention, to obtain one guide vane 6 of the structure H, two neighboring composite angular segments 9, are disposed adjacent one another. In such a configuration, two sliced portions 12, respectively belonging to two neighboring composite angular segments 9, are matching to define the guide vane 6.

Therefore, each sliced portion 12 is disposed against an adjacent sliced portion 12 of a neighboring composite angular segment 9, to form together a corresponding guide vane 6.

Also, each core arched section 10 is arranged side-by-side against two adjacent core arched sections 10 of the neighboring composite angular segments 9. Similarly, each peripheral rim section 11 is arranged side-by-side against two adjacent peripheral rim sections 11 of the neighboring composite angular segments 9.

This provides a stator hollow structure H when the composite angular segments 9 are secured together. In this stator hollow structure H of the invention, the central hub casing 3 is made from the assembly of a continuous plurality of adjacent core arched sections 10, at least some profiled guide vanes 6 are made from the assembly of a pair of adjacent angularly opposed sliced portions 12, while the external hollow duct 5 is made from the assembly of a continuous plurality of adjacent peripheral rim sections 11.

Instead of a concentrically divided groups are as per the prior art, the invention provides all angular (dial-like) dispatching allowing a continuous integration.

As seen on FIG. 3, when neighboring composite angular segments 9 are positioned together, the complementary surfaces of core arched sections 10, of adjacent sliced portions 12 and of peripheral rim sections 11 of the composite angular segments 9 composing the structure H, are matching with the complementary surfaces of the neighboring composite angular segments 9.

In a given composite angular segment 9, the core arched section 10 and the peripheral rim section 11 are each generally in the form of a cylinder section extended along an arc fragment 14 between two sliced portions 12. Each arc fragment 14 is defining an angular value, also referenced as 14.

The angular value of a composite angular segment 12 is angularly complementary to the angular values of neighboring composite angular segments 9, relative to a full periphery of the stator hollow structure H. Each arc fragment 14 can be far example chosen among angular values of about: half a circle, third of a circle, quarter of a circle, fifth of a circle or sixth of a circle.

The angular values 14 can be the result of calculation, involving both aerodynamic criterions (e.g. limiting the interferences between the stator and the rotor) and mechanical criterions (structural and fatigue resistance). Therefore, the aforementioned indicative angular values 14 are to be adjusted correspondingly to these criterions for example.

Among other criteria, at least two arc fragments 14 of two neighboring composite angular segments 9 can be angularly extended with uneven irregular angular values. Other way speaking, in such a case, each angular value is different from the angular value of at least one neighboring composite angular segment 9.

Moreover, between two sliced portions 12, a composite angular segment 9 may comprise at least one intermediate guide vane 19.

From the stator hollow structure of FIG. 3, looking at the integrated guide vane 6 on the left (generally parallel to the direction X), is seen that each composite angular segment 9 has at least two complementary outwards contact surfaces 13. One outwards contact surface 13 is on each angularly opposed sliced portion 12 to define together a complementary profile of the guide vane 6.

Thus, the complementary outwards contact surfaces 13 in a given composite angular segment 9 are angularly opposed and disposed such as, when two neighboring composite angular segments 9 are positioned together, the complementary outwards contact surfaces 13 of a sliced portion 12 is matching with the complementary outwards contact surfaces 13 of the neighboring composite angular segment 9.

From the embodiment of FIG. 3, appears also that some complementary outwards contact surfaces 13 are angularly shifted relative to the similar complementary outwards contact surfaces 13. In the example of the guide vane 6 illustrated at upper right of FIG. 3, an angular shift 15 of contact surfaces 13 of the peripheral rim section 11 is inverted backwards with regard to the bottom-forward rotational motion D. This makes the whole guide vane 6 inclined or bent by a similar angular shift 15.

The corresponding complementary outwards contact surfaces 13 of the neighboring profiled guide vane 6 are therefore located forwards those of the respective contact surfaces 13 of the rim section 11, by the angular shift 15.

This angular shift 15 is generally of a value of about 0.1° to 10°. In the embodiment of FIG. 3, the angular shift 15 of the whole guide vane 6 is of about 2° to 8°.

Still referring to the guide vane 6 shown on upper right part of FIG. 3, the vane 6 is at least locally extending in a non-parallel direction relative to a radial overall radius of the stator hollow structure H. In this guide vane 6, the radial shank location 7 is upwardly shifted against the bottom-forward rotational motion D of the set of rotating blades 1 of the shrouded rotary assembly B, relative to the radial overall radius of the stator hollow structure H.

This profiled guide vane 6 of FIG. 3 is upwardly shifted against the bottom-forward rotational motion D, to be locally tangential to the external circumference of the casing 10.

Now referring to another guide vane 6 shown on lower right part of FIG. 3, the vane 6 is also at least locally extending in a non-parallel direction relative to a radial overall radius of the stator hollow structure H. Furthermore, this profiled guide vane 6 is locally non-straight lined. In this embodiment, this profiled guide vane 6 is locally bent by two succeeding local curvatures 20-21.

A first local curvature 20 is about/adjacent to the peripheral rim section 11 and is convex upstream, i.e. the convex side is at the rear side of the vane 6 along the bottom-forward rotational motion D.

A second local curvature 21 is about/adjacent to the core arched section 10 and is concave upstream, relative to the bottom-forward rotational motion D. Thus, the concave side of the vane 6 is at the front side of the vane 6, along the rotational motion D.

Depending on embodiments, these local shifting(s)/non-linear shaping(s) or curvatures 20-21 are applied either to a profiled guide vane 6 and/or to an intermediate added guide vane 19. The local shifting(s)/curvatures 20, 21 are for static improvement and noise reduction enhancement of aerodynamic properties of the structure H.

Still referring to FIG. 3, the embodiment shows one of the guide vanes 6 (the vane 6 on the left, slightly extended along direction X), that is provided with a flanged hole 22. The flanged hole 22 is located at the vicinity of the radial shank location 7 of this vane 6. The flanged hole 22 is open on a leading edge E of the structure H.

This flanged hole 22 is provided to allow mounting/access to embarked equipment, such as electronic devices (actuators, sensors, etc.) and/or hydraulic devices (fluid pressure lines, etc.) and/or mechanical devices (rotational power transmission axis to the stator gearbox 4, etc.).

According to the FIG. 3, the manufacturing method comprises a preforming step of individually shaping each composite angular segment without curing; and a securing stage providing a simultaneous curing of the composite angular segments together, in a common curing chamber.

From FIG. 4, is shown a reinforced composite angular segment 9. The segment 9 is reinforced by incorporating at least one reinforcing honeycomb band 16, for stabilization purposes of the stator hollow structure H.

In this embodiment, two reinforcing honeycomb bands 16 are incorporated to the composite angular segment 9. One band 16 is in the core arched section 10 and another band 16 is in the peripheral rim section 11. Other embodiments provide e.g. two, three or more reinforcing honeycomb bands 16 in each core arched section 10 and/or peripheral rim section 11.

On FIG. 4, the reinforcing of the composite angular segment 9 comprises incorporating;
  a surrounding honeycomb band 16, adjacent to an external face 17 of the peripheral rim section 11 and
  an inside honeycomb band 16 adjacent and about an interior face 18 of the central core arched section 10.

As seen from FIG. 4, the external face 17 is radially opposed to an inner surface of the peripheral rim section 11 directed towards the central hub casing 10. The interior face 18 of the central core arched section 10 is radially opposed to an outer surface of the central hub casing 10 directed towards the peripheral rim section 11. In other terms, the interior face 18 is turned towards the rotational axis of the rotary blades 10, while the external face 17 is turned towards the structural element (e.g. a fin) of the aircraft A which is carrying the stator hollow structure H.

Figure 5:
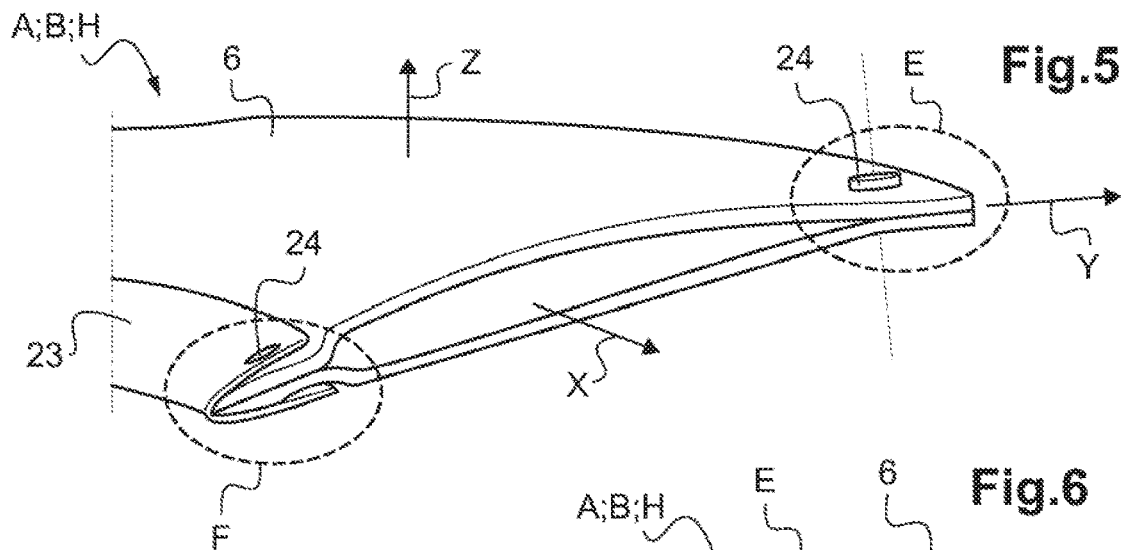
FIG. 5 is a schematic perspective part section view of an example of an embodiment composite angular segment as per the invention, typically formed and cured individually and finalized through gathering after machining; a U-shaped spoiler covering at least partly a leading edge of a guide vane.
Figure 6:
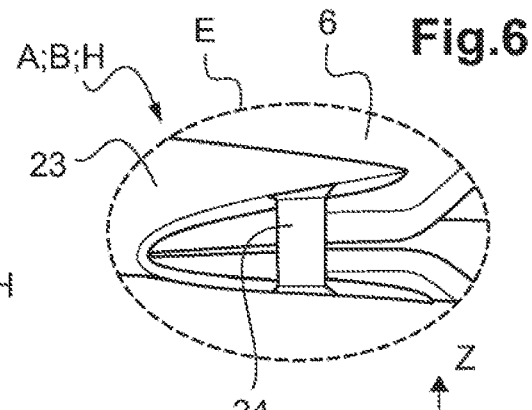
FIG. 6 is a schematic perspective part section view of the embodiment of FIG. 5, showing how the U-shaped spoiler at leading edge is secured by additional securing items (countersunk rivets).
Figure 7:
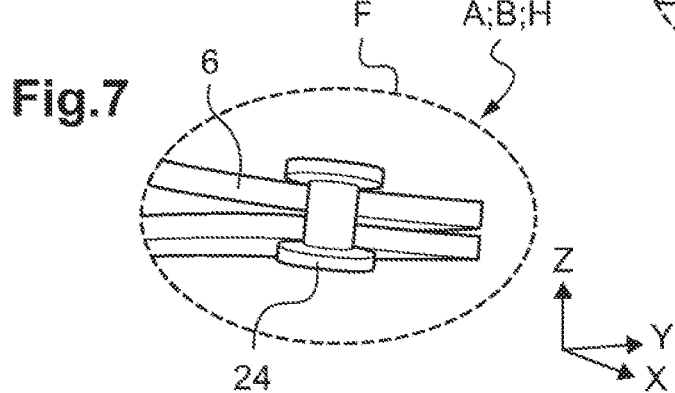
FIG. 7 is a schematic perspective part section view of the embodiment of FIG. 5, showing portions of neighboring composite angular segments secured at a trailing edge by additional securing items (universal rivets).

Now referring to FIGS. 5-7, further embodiments of the structure H of the invention are described.

FIG. 5 shows another embodiment. The composite angular segments 9 are formed and cured individually and gathered by additional securing items. As per the invention, embodiments provide one or a plurality of added device(s) on the profiled guide vanes 6 and/or on intermediate added guide vanes 19.

It is commonplace that a leading edge E of a guide vane (6; 19) may suffer from physical and chemical attacks. Meanwhile, the shape and location of a trailing edge F of a guide vane (6; 19) may have a considerable detrimental effect upon the noise reduction, but may also be exposed to erosion and the like.

On FIG. 5, a U-shaped spoiler 23 is mounted at the leading edge E. The U-shaped spoiler 23 covers at least a part of the corresponding guide vane 6. In embodiments, a plurality of spoilers 23 are mounted radially adjacent on guide vanes 6; 19, to provide together an overall protection noise reduction. In embodiments, at least one U-shaped spoiler 23 is disposed at the trailing edge F, to enhance noise reduction and to provide protection.

From FIG. 6 is shown a U-shaped spoiler 23 which is secured around adjacent edges of two neighboring, composite angular segments 9, by additional securing items 24. The items 24 are flush with the corresponding external skin of the U-shaped spoiler 23, in continuity with an outer envelope of the guide vane 6. The shown securing items 24 are countersunk rivets.

The neighboring composite angular segments 9 have complementary outwards contact surfaces 13 of one guide vane 6, providing a face-to-face interlace. The complementary outwards contact surfaces 13 are secured one to the other about the trailing edge F, by additional securing items 24 according to the FIG. 7. Here, the securing items 24 are universal rivets.

Embodiments provide rigidly securing together at least two composite angular segments 9, and/or rigidly securing such composite angular segments with the aircraft A, and/or attaching to composite angular segments 9 extra pieces such as the U-shaped spoiler 23 with imported additional securing items 24. Such securing items 24 can be chosen among: rivets, countersunk rivets and screws and bolt groups, or direct mechanical attaching with co-curing, shimming, gluing, cross-melting and soldering.

Figure 8:
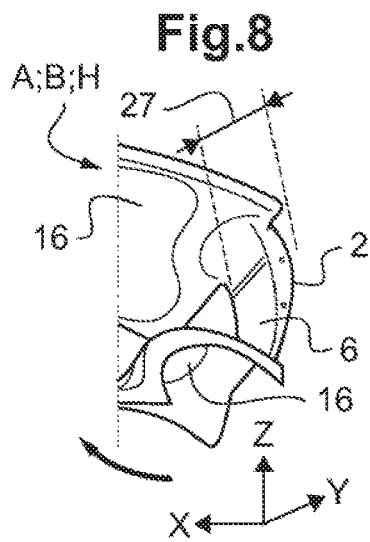
FIG. 8 is a schematic perspective part section view, showing a trailing edge with optimized contour for reducing stator-rotor interaction, the contour having a curved convex profile.
Figure 9:
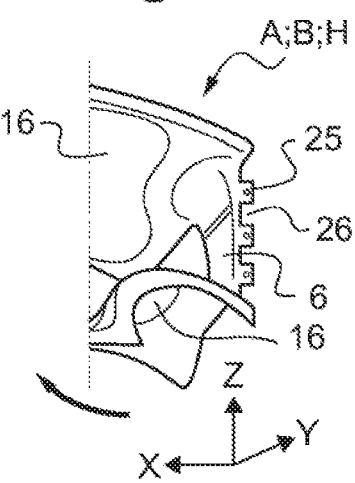
FIG. 9 is a schematic perspective part section view, showing a trailing edge with optimized contour with a series of convex contour tenons and concave mortise keys, formed as angular crenels and niche mortises.
Figure 10:
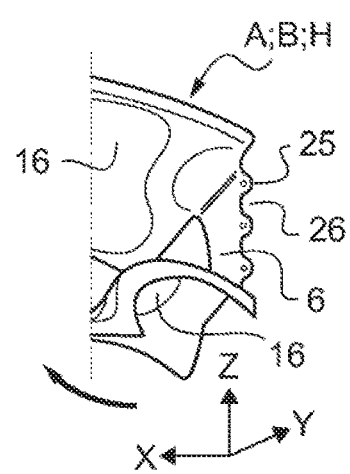
FIG. 10 is a schematic perspective part section view, showing a trailing edge with optimized contour with a series of convex contour tenons and concave mortise keys, formed as undulated wave tangs and ripple mortises.

Now reference is made to FIGS. 8-10, focusing on optimized contours for the guide vane leading edge and trailing edge. FIGS. 8-10 show embodiments which have at least a guide vane 6 (or intermediate added vane 19) with at least one convex contour on the trailing edge F, for aerodynamic performance enhancement.

On FIG. 8, the guide vane 6 gives to the trailing edge F a convex contour 25, in the shape of a single curvature. The convex contour 25 gives to the guide vane 6, an enlarged transverse dimension 27, between the radial shank location 7 and the tip end location 8, as compared with the corresponding dimension e.g. about radial ends of the guide vane 6. The transverse dimension 27 is extended along the eponymous direction Y. Here, the enlarged transverse dimension 27 is transversely maximized at a climax location about the middle of the radial overall dimension of the guide vane (6; 19).

Referring now to FIG. 9, a trailing edge F can comprise
  an optimized contour for reducing stator-rotor interaction. The trailing edge F has a profile with a series of convex contour tenons 25 and concave mortise keys 26, formed as angular crenels.

On FIG. 10 is shown a trailing edge F with optimized contour having a series of convex contour tenons 25 and concave mortise keys 26, respectively formed as undulated wave tangs and ripple mortises.

The FIG. 11 describes embodiments of a manufacturing method generally designated by J. This manufacturing method J of the invention is for making a stator hollow structure H for a shrouded rotary assembly B for an aircraft A.

The variants of the stator hollow structure H are those referred to on FIGS. 2-10. The manufacturing method 5 involves certain components of composite material 29. Here, components of composite material 29 is a common expression for designating raw/semi-finished materials, added items and other components like e.g. reinforcing honeycomb bands 16, additional securing items 24, composite constitutive products, etc.

The manufacturing method J mainly comprises the following steps, providing that:
- at a preparing step 28, is executed preparing separately from components of composite material 29 at least three composite angular segments 9, so that each composite angular segment 9 comprises: a core arched section 10 for the central hub casing 3, a peripheral rim section 11 for the external hollow duct of and a pair of angularly opposed sliced portions 12 for guide vanes 6, one portion 12 being dedicated respectively to one profiled guide vane 9; and
- at a finalizing step 33, the stator hollow structure H is finalized from the composite angular segments 9. The finalizing step 33 is allowing the manufacturing method J to manufacture a unitary piece encompassing the overall shape of the stator hollow structure H.

As explained below, the preparing step 28 and the finalizing step 33 comprise various stages. Stages are sub phases of one given step. Depending on embodiments, a given stage belongs to the preparing step 28 or to the finalizing step 33.

According to an embodiment, a preforming stage 32 of the preparing step 28 is providing laminating separately each composite angular segment 9 each in a dedicated layup tool 31, thus forming each segment with a predetermined handleable preform. The preparing step 28 also provides a curing stage 37 wherein each composite angular segment 9 is cured separately one from the others, in at least one autoclave to be considered as a curing chamber (to be considered as a molding device 35).

The finalizing step 33 in this embodiment of the manufacturing method J also provides a securing stage 36 that is executed by direct mechanical attaching of cured segments 9 with additional securing items 24.

In another embodiment, the preparing step 28 provides a layup stage 30 of arranging separately each composite angular segment 9 in a dedicated layup tool 31. The preforming stage 32 provides preforming individually each composite angular segment 9 without curing, with each dedicated layup tool 31 acting as a molding device. Consequently, in this embodiment, the securing stage 36 of the finalizing step 33 provides a simultaneous curing of the composite angular segments 9 together, in a common curing chamber chosen among: autoclave and oven.

The FIG. 11 shows also that the manufacturing method J provides an addition stage 38 during the finalizing step 33 of incorporating in at least one composite angular segment 9, at least an intermediate added guide vane 19, between the angularly opposed sliced portions 12.

Moreover, the preparing step 28 may provide a reinforcing stage 39 of incorporating to at least one of the composite angular segments 9, at least a reinforcing honeycomb band 16.

Above was exposed the locations where such a reinforcing honeycomb band 16 is possibly incorporated in the core arched section 10 and/or the peripheral rim section 11, during the reinforcing stage 39.

The manufacturing method J can provide a protection stage 41 typically operated during the finalizing step 33. The protection stage 41 is providing mounting at least a U-shaped spoiler 23, covering at least partly an axial edge of the guide vane 9 or 16.

The protection stage 41 comprises mounting the U-shaped spoiler 23 on the leading edge E of the guide vane 6. The protection stage 41 is chosen in some embodiments to operate the rigid attachment of the spoiler 23 through: direct mechanical attaching with additional securing items 24 and continuously integrating the U-shaped spoiler 23 with the composite angular segments 9.

The rigid attachment of the spoiler 23 is for instance executed by direct mechanical attaching with additional securing items 24 in the form of countersunk rivets.

In embodiments exemplified in FIG. 11, the finalizing step 33 includes:
- a placing stage 34 of disposing the involved composite angular segments 9 together in a molding device 35, each composite angular segment 9 being disposed aside a neighboring composite angular segment 9, with:
  - each sliced portion disposed against an adjacent sliced portion 12 of a neighboring composite angular segment 9 to form together a common profiled guide vane (6; 19);
  - each core arched section 10 abutting two adjacent core arched sections 10 of the neighboring composite angular segments 9; and
  - each peripheral rim section 1 abutting two adjacent peripheral rim sections 11 of the neighboring composite angular segments 9;
- securing stage 36 of forming the stator hollow structure H in a unitary one-piece encompassing the overall shape; the securing stage 36 providing securing together the continuously integrated composite angular segments 9.

In an embodiment, the manufacturing method J provides that, after at least one of steps of preforming and/or finalizing, is executed a stage of machining 40 separately the composite angular segments 9 and/or the whole stator hollow structure H. The stage of machining 40 is chosen among executing at least one stage of: milling, perforating, boring and grinding.

The invention allows embodiments involving one or a plurality of composite manufacturing techniques. These composite manufacturing techniques are chosen among e.g.: closed mold Resin Transfer Molding ("closed RTM"), heated RIM, injection-compression RTM, Vacuum Assisted Resin Infusion ("VARI"), Liquid Resin Infusion ("LRI"), impregnation, injection molding, roving, room temperature vulcanization "RTV") and autoclave RTM.

Also, depending on embodiments, the steps / stages as well as on the components/parts/groups composing the structure H, various types of available components 29 are to be involved by the invention. Among the components 29 that the manufacturing method uses in embodiments, are e.g.: preforms, resin, membranes, prepregs, compounds skeletons, and matrix films.

The following table T1 is listing the references signs in the drawings.

TABLE T1

| REF. | DESIGNATION | |
|---|---|---|
| X | Longitudinal direction | Along roll axis |
| Y | Transverse direction | Along pitch axis |
| Z | Elevation direction | Along yaw axis |
| A | Aircraft | Rotary wing aircraft, helicopter |
| B | Shrouded rotary assembly | E.g. Fenestron ® |
| C | Control airflow | |
| D | Bottom-forward rotational motion | (of rotary blades 1) |
| E | Leading edge | |
| F | Trailing Edge | |
| G | Driven rotor system | |
| H | Stator Hollow Structure | |
| J | Manufacturing method | |

TABLE T1-continued

| REF. | DESIGNATION | |
|---|---|---|
| I | Main Rotor | (See FIG. 1) |
| 1 | Rotary blades | |
| 2 | Tail boom | |
| 3 | Central hub casing | |
| 4 | Stator gearbox | |
| 5 | External hollow duct | |
| 6 | Integrated guide vanes | |
| 7 | Radial shank location | |
| 8 | Radial tip location | |
| 9 | Composite angular segment | |
| 10 | Core arched section | |
| 11 | Peripheral rim section | |
| 12 | Sliced portion | Angularly opposed in each segment 9 |
| 13 | Complementary outwards contact surface | |
| 14 | Arc fragment - Angular value | |
| 15 | Angular shift | |
| 16 | Reinforcing honeycomb band | |
| 17 | External face | E.g. of the peripheral rim section 11 |
| 18 | Interior face | E.g. of the core arched section 10 |
| 19 | Intermediate added guide vane | |
| 20 | First local curvature | |
| 21 | Second local curvature | |
| 22 | Flanged hole | E.g. on a guide vane 6/19 |
| 23 | U-shaped spoiler | E.g. on a guide vane 6/19 |
| 24 | Additional securing item | |
| 25 | Convex contour tenon | |
| 26 | Concave contour key | |
| 27 | Transverse dimension | |
| 28 | Preparing step | |
| 29 | Components of composite material | |
| 30 | Layup step | |
| 31 | Layup tool | |
| 32 | Preforming step | |
| 33 | Finalizing step | |
| 34 | Placing stage | |
| 35 | Molding device | |
| 36 | Securing stage | |
| 37 | Curing stage | |
| 38 | Addition stage | |
| 39 | Reinforcing stage | |
| 40 | Machining stage | |
| 41 | Protection stage | |

The invention may be subjected to variations as to its implementation, said variations not being possibly identified exhaustively.

What is claimed is:

1. A manufacturing method for making a stator hollow structure for a shrouded propulsion rotary assembly in an aircraft, the method comprising:
   forming at least three angular segments separately of composite material, each angular segment integrally formed as a single-piece with a central hub arc fragment, a peripheral rim arc fragment and a pair of vane slice segments extending between the central hub arc fragment and the peripheral rim arc fragment;
   securing the at least three angular segments together at central radial angles relative to each other, wherein the central hub arc fragments define a cylindrical hub casing, the peripheral rim arc fragments define a hollow cylindrical duct concentric to the cylindrical hub casing, and the pairs of vane slice segments define at least three guide vanes fixed between the cylindrical hub casing and the hollow cylindrical duct; and
   mounting at least one U-shaped spoiler at least partly covering one of the at least three guide vanes.

2. The manufacturing method of claim 1, wherein forming at least three angular segments separately comprises:
   individually shaping each angular segment such that at least one of the three guide vanes has a non-linear profile relative to the radial direction of the stator hollow structure.

3. The manufacturing method of claim 1, wherein forming the at least three composite angular segments separately comprises:
   individually shaping each angular segment such that at least one of the angular segments has a first angular value being different from a second angular value of one of the other angular segments.

4. The manufacturing method of claim 1, further comprising reinforcing at least one of the angular segments with a honeycomb band incorporated in at least one of the central hub arc fragment and the peripheral rim arc fragment, the honeycomb band stabilizing the stator hollow structure.

5. The manufacturing method of claim 2, wherein the non-linear profile is defined by a local curvature, wherein the local curvature comprises at least one of a first local curvature adjacent the hollow cylindrical duct and being convex upstream relative to a rotational direction, and a second local curvature adjacent the cylindrical hub casing and being concave upstream.

6. The manufacturing method of claim 1, wherein forming each angular segment comprises forming at least one intermediate guide vane between the pair of vane slice segments.

7. The manufacturing method of claim 1, wherein securing the angular segments together comprises attaching the angular segments with a securing item.

8. The manufacturing method of claim 1, wherein securing the angular segments together comprises directly mechanically attaching the angular segments to each other.

9. The manufacturing method of claim 1, wherein securing the at least three angular segments together comprises:
   securing a first vane slice segment of a first angular segment to a first vane slice segment of a second angular segment; and
   securing a second vane slice segment of the first angular segment to a first vane slice segment of a third angular segment.

10. A stator hollow structure for a shrouded propulsion rotary assembly for an aircraft; the stator hollow structure comprising:
    at least three angular segments formed of composite material, wherein each of the angular segments has an inner core arc fragment and a peripheral rim arc fragment and a pair of vane slice portions extending between the inner core arc fragment and the peripheral rim arc fragment at distal angular ends,
    wherein the at least three angular segments are joined so that the inner core arc fragments define a circumference of a central hub being and the peripheral rim arc fragments define an external hollow duct concentric to the central hub, and
    wherein and the vane slice portions are joined to define at least three guide vanes, wherein at least one of the three guide vanes has a non-linear profile relative to a radial direction of the stator hollow structure,
    wherein the non-linear profile is defined by a local curvature, wherein the local curvature comprises at least one of a first local curvature adjacent the external hollow duct and being convex upstream relative to a rotational direction, and a second local curvature adjacent the central hub and being concave upstream.

11. The stator hollow structure of claim 10, wherein at least one of the angular segments has a first angular value between the distal angular ends being different from a second angular value of one of the other angular segments.

12. The stator hollow structure of claim 10, wherein at least one of the three guide vanes has a convex contour relative to a radial direction of the stator hollow structure.

13. The stator hollow structure of claim 10, wherein the angular segments comprise at least one intermediate guide vane between the pair of vane slice portions.

14. A stator hollow structure for a shrouded propulsion rotary assembly for an aircraft, the stator hollow structure comprising:
a central hub casing for a stator gearbox;
an external hollow duct surrounding the central hub casing; and
at least three guide vanes, each guide vane extending between central hub casing and the external hollow duct, wherein at least one of the three guide vanes has a non-linear profile relative to the radial direction of the stator hollow structure,
wherein the central hub casing, the external hollow duct and the three guide vanes are formed by at least three angular segments joined together at central radial angles relative to each other,
wherein the non-linear profile is defined by a local curvature, wherein the local curvature comprises at least one of a first local curvature adjacent the external hollow duct and being convex upstream relative to a rotational direction, and a second local curvature adjacent the central hub casing and being concave upstream.

15. The stator hollow structure of claim 14, wherein the non-linear profile comprises a convex contour relative to a radial direction of the stator hollow structure.

16. The stator hollow structure of claim 14, further comprising at least one U-shaped spoiler mounted to at least partly cover one of the at least three guide vanes.

17. The stator hollow structure of claim 14, wherein at least one guide vane is oriented at an angular shift different than a radial direction of the central hub casing, and wherein the guide vane has a hub end connected to the central hub casing and a duct end connected to the external hollow duct, wherein due to the angular shift, the hub end is positioned forward of the duct end relative to a direction of rotation.

18. The stator hollow structure of claim 17, wherein the hub end of at least one of guide vanes is oriented tangential to an external circumference of the central hub casing.

19. The stator hollow structure of claim 14, wherein a first angular segment extends a first central radial angle being different than a second central radial angle of a second angular segment.

* * * * *